(No Model.)
G. ANDREWS.
ANIMAL TRAP.
No. 491,329.  Patented Feb. 7, 1893.
Fig. 1.
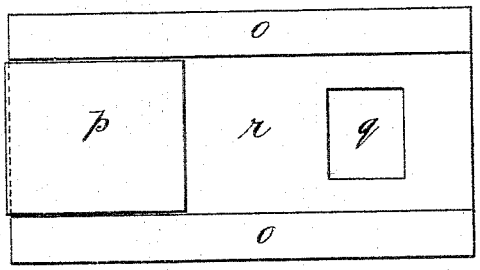
Fig. 2.
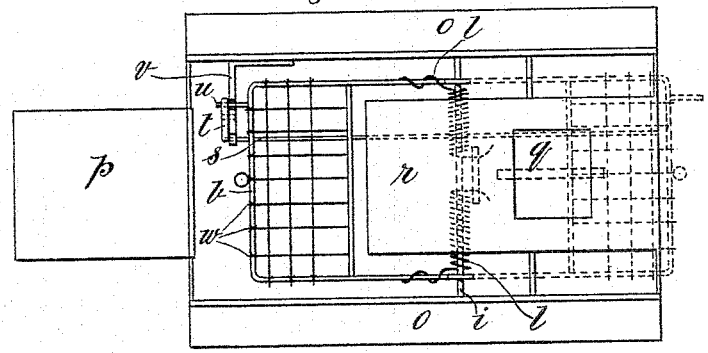
Fig. 3.  Fig. 4.
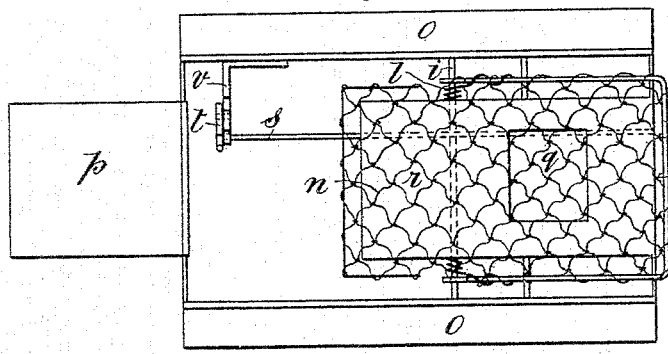 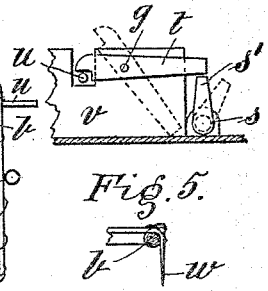
Fig. 5.
Witnesses.  Inventor:
A. Judd.  George Andrews,
H. Calcutt.  By John Pitt Bayly,
His Attorney in Fact.

UNITED STATES PATENT OFFICE.

GEORGE ANDREWS, OF ASHFORD, ENGLAND.

ANIMAL-TRAP.

SPECIFICATION forming part of Letters Patent No. 491,329, dated February 7, 1893.

Application filed April 12, 1892. Serial No. 428,910. (No model.) Patented in England July 4, 1890, No. 10,372.

*To all whom it may concern:*

Be it known that I, GEORGE ANDREWS, engineer, a subject of the Queen of Great Britain, residing at Jessamine Villa, Hunter's Road, Willesborough, Ashford, in the county of Kent, England, have invented a new and useful Improvement in Means or Apparatus for Trapping Animals and Birds, (for which I have obtained a patent in Great Britain, No. 10,372, bearing date July 4, 1890,) of which the following is a specification.

My invention relates to improvements in means or apparatus for trapping animals and birds, which consists of a box of any suitable shape below a platform or trap-door, with a fall-down, fall-over, or close-up cage, the said cage or crusher closing directly an animal or bird puts its feet on the trap-door by its weight operating on a lever, this said lever releasing the trapping mechanism or device by dropping on or over the said animal or bird for the purpose of catching the same alive or killing the same instantaneously. I attain these objects by the mechanism illustrated in the accompanying drawings, in which—

Figure 1 is a plan of the box trap. Fig. 2, is a plan of the interior of Fig. 1 set with the crusher for killing an animal, the dotted lines indicate the crusher closed. Fig. 3, is a plan of Fig. 2, with a net to catch an animal or bird alive. Fig. 4, is an enlarged view of the mechanism to release the crusher or net for Figs. 2, and 3. Fig. 5, is a section of the crusher with one of the spikes of Fig. 2.

Similar letters refer to similar parts throughout the several views.

This invention I attach to various suitably-shaped boxes, as in Figs. 1, 2, and 3, with a raised platform $r$, having a channel all round or partially round the said platform $r$. Across the center beneath the platform $r$ I fix, by means of coil-springs $l$ on a bar $i$, a curved arm or arms $b$, pivoted to the bar $i$ in the channel on either side of the platform $r$, and to this curved arm I place a suitable net $n$ or any other device, such as bars with spikes $w$. In the center of the platform I construct a trap-door $q$, attached to a lever $s$ or levers, (or other device,) the end of which runs out at the end of the box in the channel toward a loose catch $t$, pivoted at $g$ on a support $v$, to which is forced back the curved arm $b$ and held with a pin $u$ in a notch or slot by the lever mechanism $s'$ down into the channel. To the top at one end and at the two sides I provide loosely-hinged shutter-flaps $o$ $o$ and $p$ for the purpose of concealing the mechanism placed in the beforesaid channels. The shutter-flaps $o$ $o$ and $p$ are then closed over flush with the platform $r$ and trap-door $q$, as in Fig. 1, the whole being covered with a gravelly surface, giving the trap the appearance of the ordinary ground.

Directly a bird or animal places its feet on the trap $q$ the lever $s$ releases the curved arm $b$, which said arm $b$ strikes open the flaps and falls down over the bird or animal by the power of the springs and secures the bird or animal alive. The trap-door $q$ is constructed to fall by the weight of the animal and turn the lever from the loose arm $t$ as indicated by dotted lines Fig. 4, on which the aforesaid loop is placed in order to release the pin $u$, loop $b$, or ring to throw the trap. One end of the trap door $q$ is fixed to the lever or rock-shaft $s$ above the dotted lines described in Figs. 2, and 3, so that when an animal or bird places its feet upon the trap door $q$ the said trap door by its weight, falls, thereby giving a slight turn to the rock-shaft or lever $s$ which forces the crank end $s'$ away from the loose catch $t$; when the springs $l$ $l$ throw the frame $b$ and catch pin away from the slot in the support $v$ and over the aforesaid animal or bird instantaneously. To the fall-down traps I adopt the same or similar throw-off mechanism with a lever or levers applied in such a manner that by a small weight on the trap-door a cage is forced down on to a platform by the power of spiral or any other springs. Catches, set-pins, pulls, or draw-ups are used in the various positions for the purpose of holding the cage or crusher up during the process of setting the said traps. The aforesaid may be adapted to catch the bird or animal alive, or I use a fall-down herein termed a "crusher" when I wish to kill the animal instantaneously against the platform.

This invention may be constructed of any metallic, hemp, silk, cotton, wood, or of any other suitable substance.

The object of my invention is to provide an instantaneous fall-down cage, net, throw-over trap to catch animals or birds of any dimensions without injuring the same, or to adopt the "crusher" principle when the bird or animal is intended to be instantaneously killed.

It will be understood that the shapes, materials, and proportions of the various parts may be varied in many ways within the scope of my invention.

What I claim, and desire to secure by Letters Patent of the United States, is—

1. In an animal trap, a receptacle having a pivoted platform thereon, a rod with which the same is connected, said rod having a cam or engaging lug on its extremity, a pivoted trigger or latch with which the latter engages, a spring-actuated impaling flap pivoted over said platform, and means thereon for engaging the opposite end of the impaling flap and thereby setting the trap.

2. An animal trap having a series of hinged flaps secured to the top edges of the casing thereof, to be turned over on the same and thereby conceal the trap mechanism when the trap is set, substantially as herein described.

GEORGE ANDREWS.

Witnesses:
THOMAS BUNCE,
HENRY LADD,
*Clerks to Messrs. Plummer & Fielding, Solicitors, Canterbury, England.*